(No Model.)

G. C. ILLINGWORTH.
NUT LOCK.

No. 402,739. Patented May 7, 1889.

WITNESSES:

INVENTOR:
G. C. Illingworth
BY Munn & Co.
ATTORNEYS.

UNITED STATES PATENT OFFICE.

GEORGE C. ILLINGWORTH, OF RARITAN, NEW JERSEY.

NUT-LOCK.

SPECIFICATION forming part of Letters Patent No. 402,739, dated May 7, 1889.

Application filed November 28, 1888. Serial No. 292,064. (No model.)

*To all whom it may concern:*

Be it known that I, GEORGE C. ILLINGWORTH, of Raritan, in the county of Somerset and State of New Jersey, have invented a new and useful Improvement in Nut-Locks, of which the following is a full, clear, and exact description.

My invention relates to an improvement in nut-locks especially adapted for use in connection with railroad-rails, and has for its object to provide a device of simple construction which, when applied to the railway-joint, will not be loosened by the vibration of the rail, and which will also effectually provide against the spreading of the rails and obviate the existing necessity of tightening the lock-nuts daily.

The invention consists in the novel construction and combination of the several parts, as will be hereinafter fully set forth, and pointed out in the claims.

Reference is to be had to the accompanying drawings, forming a part of this specification, in which similar letters of reference indicate corresponding parts in both the figures.

Figure 1:
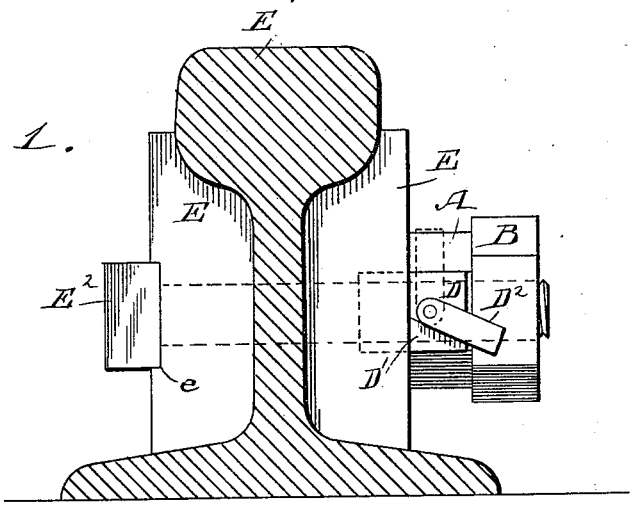
Figure 2:
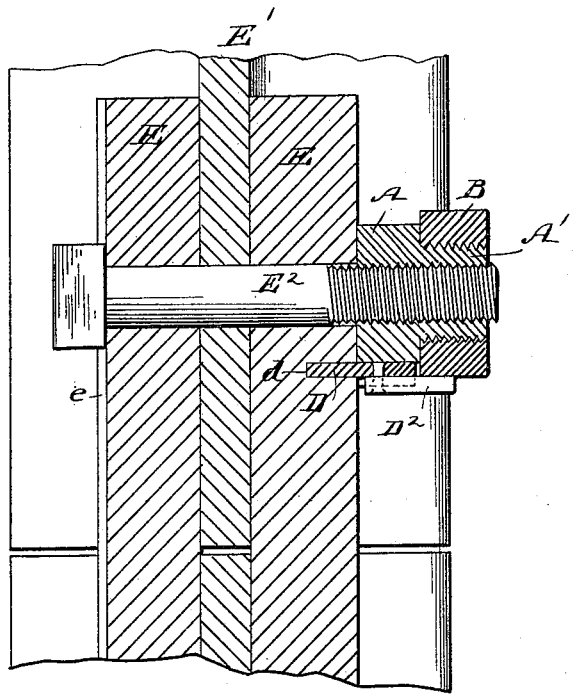

Figure 1 is a side elevation of the lock-nuts applied to a railway-rail joint, and Fig. 2 is a horizontal section through the joint and through the nut.

In carrying out the invention I employ two lock-nuts, A and B, the lock-nut A being the inner or main nut and the nut B the auxiliary locking-nut. The inner or main lock-nut, A, is provided with a cylindrical exteriorly-threaded extension, A', upon the outer face, which extension preferably constitutes an integral portion of the body of the nut, as best shown in Fig. 2. The outer or auxiliary lock-nut, B, is provided with an interiorly-threaded aperture of sufficient diameter to permit the said auxiliary nut to be conveniently screwed upon the extension of the inner or main lock-nut. Both of the lock-nuts A and B are preferably polygonal in contour, the nut B being larger than nut A.

In connection with the lock-nuts a key, D, is employed, consisting, preferably, of a rectangular piece of metal having one smooth face and a downwardly-inclined shoulder, D', produced upon the opposite face, above which shoulder a button, D², is pivoted, which button, when in a locked position, is adapted to be supported by the said shoulder, as illustrated in Fig. 1.

In operation, the fish-plates E, having been placed in proper contact with the rail E', any ordinary form of bolt, E², is passed through said fish-plates and web of the rail in the usual manner. It is preferable in practice, however, to produce a longitudinal recess, e, in the outer face of one of the fish-plates, and it should be of sufficient width to just accommodate the head of the bolt, as shown in Fig. 1, in order to assist in retaining the bolt in a fixed and positive position. Adjacent to the aperture in the fish-plate, through which the threaded end of the bolt E² passes, a vertical recess, d, is formed, for a purpose hereinafter set forth. The inner or main lock-nut, A, is now screwed upon the projecting threaded end of the bolt E² until the said nut is brought to a firm bearing against the contiguous fish-plate. The key D is now inserted in the recess d in such a manner that the smooth face of the key will approach the outer surface of the nut. When the key is thus placed, the main or inner nut, A, is effectually prevented from turning. The key D is retained in its seat by the outer or auxiliary nut, B, as when the said nut B is screwed upon the extension A' of the inner nut the inner face of the said auxiliary nut will bear against the outer edge of the key, as best shown in Fig. 2, effectually tying it in its seat. The outer auxiliary nut, B, being connected with the main or inner nut and having no connection with the bolt itself, the chance of the auxiliary nut becoming loosened is almost an improbability; but as a guard against this, the button D², pivoted to the key, is turned upward and permitted to drop down to a bearing upon the key-shoulder D', as illustrated in Fig. 1, whereupon the said button will be brought in contact with one of the outer faces of the auxiliary nut, effectually securing the latter; but although thus secured by throwing up the button the outer nut may be expeditiously removed.

Having thus described my invention, what I claim as new, and desire to secure by Letters Patent, is—

1. The combination, with a fish-plate, the tie-bolts, a main lock, and an auxiliary nut, of a key inserted in the fish-plate, projected to one side of the main nut, and an arm pivoted upon the key and projected to one side of the auxiliary nut, substantially as shown and described.

2. The combination, with a fish-plate, the bolts, and the main lock-nut, of a key inserted into the fish-plate and projected to one side of the main nut, and an auxiliary nut secured against the main nut, said auxiliary nut being of greater diameter than the main nut, forming a projecting flange, said flange projecting over and against the outer edge of said key, substantially as and for the purpose specified.

3. The combination, with a fish-plate, the bolts, a main lock-nut screwed upon the same, provided with an exteriorly-threaded projection, of a key inserted in the fish-plate and projected to one side of and in contact with the main nut, said key provided with a downwardly-inclined shoulder on its outer face, an auxiliary nut screwed on the projecting end of the main nut and against the outer edge of the key, and a button pivoted to the said key and adapted to be swung to one side of the auxiliary nut, and limited in its downward movement by the inclined shoulder, substantially as and for the purpose described.

GEORGE C. ILLINGWORTH.

Witnesses:
IRVING WEAVER,
GEORGE A. LANE.